United States Patent [19]

Sugano

[11] Patent Number: 5,457,454
[45] Date of Patent: Oct. 10, 1995

[54] INPUT DEVICE UTILIZING VIRTUAL KEYBOARD

[75] Inventor: Jin Sugano, Kawasaki, Japan

[73] Assignee: Fujitsu Limited, Kawasaki, Japan

[21] Appl. No.: 123,996

[22] Filed: Sep. 21, 1993

[30] Foreign Application Priority Data

Sep. 22, 1992 [JP] Japan ................... 4-252733

[51] Int. Cl.$^6$ .................. G06F 3/02; G06F 3/03
[52] U.S. Cl. .................. 341/22; 341/26; 345/179
[58] Field of Search .................. 341/22, 23, 26, 341/28; 345/179–183; 364/709.16, 709.15

[56] References Cited

U.S. PATENT DOCUMENTS

| | | | |
|---|---|---|---|
| 4,684,926 | 8/1987 | Yong-Min | 341/28 |
| 5,105,375 | 4/1992 | Lapeyre | 364/709.16 |
| 5,261,079 | 11/1993 | Celi, Jr. | 364/928 |

FOREIGN PATENT DOCUMENTS

| | | | |
|---|---|---|---|
| 61-246826 | 11/1986 | Japan . | |
| 52622 | 3/1987 | Japan | G06F 3/02 |
| 63-278114 | 11/1988 | Japan . | |
| 94253 | 4/1993 | Japan | G06G 3/023 |

Primary Examiner—James J. Groody
Assistant Examiner—Glenton B. Burgess
Attorney, Agent, or Firm—Armstrong, Westerman, Hattori, McLeland & Naughton

[57] ABSTRACT

An input device, which utilizes a virtual keyboard, includes a device for designating at least one input-position in a virtual keyboard displayed on a display; an input-symbol defining device for defining a form and a meaning of each input-symbol drawn by the designating means (e.g., a write-pen); and a symbol recognition device for discriminating the input-position and related input-symbol drawn at the input-position on the basis of information defined by the input-symbol defining means. The input device generates a specified input-code in a real keyboard in accordance with a combination of the input-position and the input-symbol, and displays characters or symbols corresponding to the input-code on the display means. Preferably, the form of each input-symbol includes a length of a segment drawn by the designating device and a direction in which the segment extends. Further, the meaning of each input-symbol includes information about a correspondence between the form of each input-symbol and a method in which at least one key in the real keyboard is depressed.

18 Claims, 8 Drawing Sheets

Fig. 4

| INPUT CONTENT | REAL KEYBOAD | VIRTUAL KEYBOAD |
|---|---|---|
| d | STROKE OF ONLY d-KEY | d · |
| d i | SIMULTANEOUS STROKES OF d-KEY AND LEFT-SHIFT KEY | ←d |
| d u | SIMULTANEOUS STROKES OF d-KEY AND RIGHT-SHIFT KEY | d → |

Fig. 5 A

| a | K | S | T | N | AUX-1 |
|---|---|---|---|---|---|
| H | M | Y | R | W | AUX-2 |

Fig. 5 B

|  | ① · | ② → | ③ ↓ | ④ ← | ⑤ ↑ |
|---|---|---|---|---|---|
| a | A(あ) | I(い) | U(う) | E(え) | O(お) |
| K | KA(か) | KI(き) | KU(く) | KE(け) | KO(こ) |
| S | SA(さ) | SI(し) | SU(す) | SE(せ) | SO(そ) |
| T | TA(た) | TI(ち) | TU(つ) | TE(て) | TO(と) |
| N | NA(な) | NI(に) | NU(ぬ) | NE(ね) | NO(の) |
| H | HA(は) | HI(ひ) | HU(ふ) | HE(へ) | HO(ほ) |
| M | MA(ま) | MI(み) | MU(む) | ME(め) | MO(も) |
| Y | YA(や) |  | YU(ゆ) |  | YO(よ) |
| R | RA(ら) | RI(り) | RU(る) | RE(れ) | RO(ろ) |
| W | WA(わ) |  |  |  | WO(を) |
| AUX-1 | ˝ | ° | YOUON |  | N(ん) |
| AUX-2 |  |  |  |  |  |

Columns: ① CONVERSION / NON-CONVERSION, ② NON-CONVERSION, ③ EXTENDED CONVERSION, ④ CHINSE-CHARACTER DICTIONARY

INPUT DEVICE UTILIZING VIRTUAL KEYBOARD

BACKGROUND OF THE INVENTION

1. Field of the Invention

The present invention relates to an input device utilizing a virtual keyboard which enables desired data to be input into a portable personal computer, etc., by designating at least one input-position corresponding to at least one key indicated in an image of a key arrangement displayed on a display means, by means of a designating means, e.g., a write-pen.

More specifically, the present invention relates to an input device utilizing a virtual keyboard, by which an operator, especially a beginner can easily carry out input operations of various data without repeatedly depressing keys on a real keyboard.

2. Description of the Related Art

Recently, computer systems have become more compactness, smaller in size, and lighter in weight, as represented by portable personal computers. To deal with this trend, a pen-type portable computer has been developed and has begun to be produced, in which a real keyboard is not provided at all, and in which data input operations can be carried out by utilizing a virtual keyboard displayed on a screen of a display means, i.e., a display unit and a write-pen of small size.

More specifically, in the case where an operator or a user would like to process given data in a pen-type portable computer, first of all, the operator or the user has a virtual keyboard displayed as an image of a key arrangement on a screen of a display unit such as a liquid crystal display unit. Next, the operator or the user designates key positions by touching the virtual keyboard with a write-pen, etc., and inputs characters, etc., corresponding to the data to the computer.

In such a construction having an input device utilizing the above-mentioned virtual keyboard, it is unnecessary to provide a real mechanical keyboard having a relatively large size as an input device in the body of the computer. Therefore, the overall size and total weight of the pen-type computer can be reduced. Further, since it is unnecessary to operate a real keyboard by executing key strokes many times in accordance with the given data, even a beginner can rapidly input data by an easy operation of a write-pen, etc.

For example, when a transport company is ordered to transport a certain load, an employee of the transport company can take a pen-type computer with him or her to a place where the load is actually placed, and immediately make an estimate for transporting the load by using the pen-type computer.

However, in such a pen-type computer having an input device utilizing the virtual keyboard of the prior art, it was substantially impossible for an operator, etc., to simultaneously designates two different key positions on the virtual keyboard with a write-pen, etc., corresponding to the simultaneous strokes of two different keys in a real keyboard of a thumb-shift key system utilizing simultaneous operations of shift keys by thumbs and character keys by other fingers.

Here, to enable a problem regarding a conventional pen-type computer having an input device utilizing a virtual keyboard to be understood more clearly, a concrete configuration of a real keyboard in a desk-type computer, etc., and a virtual keyboard in a pen-type computer according to a prior art will be described with reference to the related drawings of FIGS. 1A and 1B. In this case, a configuration of a real keyboard and a virtual keyboard each utilizing operations of a left-shift key and a right-shift key by thumbs to input Chinese representatively.

FIG. 1A is a schematic diagram showing an arrangement of a real keyboard according to a prior art; FIG. 1B is a schematic diagram showing an arrangement of a virtual keyboard according to a prior art.

In the real keyboard of FIG. 1A, only an arrangement of head consonants each of which is respectively positioned in a first position of a syllable in Chinese (hereinafter, each of these consonants will be referred to as "Seibo") is illustrated.

In this figure, 100 denotes a real keyboard in a computer; 101 denotes lefthand keyboard portion in which an input operation of data is carried out by a left hand of an operator; 102 denotes a righthand keyboard portion in which an input operation of data is carried out by a right hand of the operator; and 103 denotes a left-shift key and 104 denotes a right-shift key. The left-shift key and the right-shift key are respectively depressed by thumbs of the left hand and the right hand. Further, among a number of character keys on the lefthand keyboard portion 101 and the righthand keyboard portion 102, a d-key indicating a "Seibo" of a character d is particularly defined by the reference numeral 105.

For example, in FIG. 1A, in the case where a "Seibo" indicated by a character d is to be input to the computer, a stroke of only d-key 105 is executed by depressing the d-key 105. On the other hand, when simultaneous strokes of d-key 105 and the left-shift key 103 are executed, phonetic information indicated by two characters "di" is input to the computer. Here, the character i in a second position of the characters "di" is equivalent to one of semivowels inserted between a "Seibo" and a vowel (hereinafter, each of these semivowels will be referred to as "Kaion"). Namely, by simultaneously depressing d-key 105 and the left-shift key 103, a combination of the "Seibo" indicated by the character d and the "Kaion" indicated by the character i is input.

Also, when simultaneous strokes of d-key 105 and the right-shift key 104 are executed, phonetic information indicated by two characters "du" is input to the computer. Namely, by simultaneously depressing d-key 105 and the right-shift key 104, a combination of the "Seibo" indicated by the character d and the "Kaion" indicated by the character u is input.

In the virtual keyboard of FIG. 1B, only an arrangement of head consonants in Chinese ("Seibo") is displayed on a display unit. In this figure, 110 denotes a display unit, e.g., a liquid crystal display unit in a computer; 111 denotes virtual keyboard which is displayed as an image of a key arrangement equivalent to the arrangement of the real keyboard on a display unit 110; and 112 denotes a write-pen functioning as a designating means. When an operator designates a key position by touching a specified key on the virtual keyboard 111 with the write-pen 112, a character corresponding to the specified key is input to the computer.

In this figure, 114 denotes a virtual left-shift key and 115 denotes a virtual right-shift key. These virtual left-shift key 114 and right-shift key 115 are respectively equivalent to the left-shift key 103 and right-shift key 104 in the real keyboard 100, and are displayed on the display unit 110, similar to the virtual keyboard 111. Further, among a number of character keys on the virtual keyboard 111, a virtual d-key indicating a "Seibo" of a character d is particularly defined by the reference numeral 113.

For example, in FIG. 1B, when the virtual d-key 113 is touched with a write-pen 112, a "Seibo" indicated by a character d is easily input into the computer. On the other hand, in the case where phonetic information indicated by two characters "di" is to be input to the computer, the operator first designates the position of the virtual left-shift key 114 with the write-pen 112, and subsequently designates the virtual d-key 113 with the same write-pen 112. Also, in the case where phonetic information indicated by two characters "du" is to be input to the computer, the operator designates the position of the virtual right-shift key 115 with the write-pen 112 at first, and subsequently designates the virtual d-key 113 with the same write-pen 112.

In other words, in the case where a combination of the "Seibo" and the "Kaion" indicated by two characters is input to the computer by utilizing the virtual keyboard, it is necessary for the operator to designate the virtual key positions by carrying out touch-operations twice.

As apparent from the above-mentioned explanation with reference to FIGS. 1A and 1B, in an input device utilizing a virtual keyboard of the prior art, two different key positions corresponding to two keys such as a virtual shift key and a virtual d-key cannot be simultaneously designated by one touch-operation with a write-pen, unlike the case of a real keyboard of a thumb-shift key system. Therefore, the input device utilizing a virtual keyboard of the prior art has a problem in that it becomes rather troublesome to input various codes, e.g., characters, which are not indicated by a key arrangement on the virtual keyboard by using a left-shift key or a right-shift key.

SUMMARY OF THE INVENTION

In view of the above-described problem, the main object of the present invention is to provide an input device utilizing a virtual keyboard in which any input-code, corresponding to an input-code that is obtained by simultaneous strokes of a plurality of keys in a real keyboard, can be generated by one touch-operation with a designating means.

A further object of the present invention is to provide an input device utilizing a virtual keyboard in which characters, etc., that are not indicated by a key arrangement, can be easily input, in a manner similar to simultaneous strokes of a plurality of keys in a real keyboard of a thumb-shift key system.

A still further object of the present invention is to provide an input device utilizing a virtual keyboard which has a function equivalent to a real keyboard of a thumb-shift key system in the case where characters indicating Chinese are input.

A still further object of the present invention is to provide an input device utilizing a virtual keyboard which has a function equivalent to a real keyboard of a thumb-shift key system in the case where Roman characters indicating Japanese are input.

To attain these objects, the input device according to the present invention includes a designating means for designating at least one input-position corresponding to at least one key in a virtual keyboard displayed on a display means; an input-symbol defining means for defining a form and a meaning of each input-symbol drawn by the designating means on the virtual keyboard; and a symbol recognition means for discriminating the input-position and related input-symbol drawn at the input-position on the basis of information defined by the input-symbol defining means and for generating at least one input-code corresponding to at least one input-code in a real keyboard.

In this case, the input device is adapted to generate a specified input-code in accordance with a combination of the input-position and the related input-symbol, and to display characters or symbols corresponding to the specified input-code on the display means.

Preferably, in the above-mentioned input device, the form of each input-symbol defined by the input-symbol defining means includes a length of a segment drawn by the designating means and a direction in which the segment extends.

Further, preferably, the form of each input-symbol defined by the input-symbol defining means includes a size of a circle drawn by the designating means 1' and a rotational direction in which the circle is drawn.

Further, preferably, in the above-mentioned input device, the meaning of each input-symbol defined by the input-symbol defining means includes information about a correspondence between the form of each input-symbol and a method in which at least one key in the real keyboard is depressed.

Further, preferably, the designating means is composed of a write-pen which draws the form of each input-symbol by touching the virtual keyboard in such a manner that the write-pen can move in at least one direction, e.g., in a right direction or a left direction.

Further, preferably, the designating means is composed of a write-pen which draws the form of each input-symbol by touching the virtual keyboard in such a manner that the write-pen can move in at least one rotational direction.

Further, preferably, the specified input-code generated in accordance with a combination of the input-position and the related input-symbol is equivalent to at least one input-code obtained by simultaneous strokes of a plurality of keys in the real keyboard.

Further, preferably, the specified input-code generated in accordance with such a combination is different from an input-code indicated simply by the input-position designated by the designating means.

In a preferred embodiment of the present invention, the input device is applied to a computer in which characters indicating Chinese are input.

In another preferred embodiment of the present invention, the input device is applied to a computer in which Roman characters indicating Japanese are input.

In the input device according to the present invention, a number of input-symbols which can be easily drawn with a single stroke of the designating means, e.g., a write-pen, is defined in advance. When a specified input-symbol is drawn by the designating means at an input-position on the virtual keyboard, the input-position and the specified input-symbol are adapted to be discriminated on the basis of the previously defined input-symbols. Further, a specified input-code is adapted to be generated in accordance with a combination of the input-position and the related input-symbol. By virtue of the thus generated input-code, it becomes possible for an input-code equivalent to that obtained by simultaneous strokes of a plurality of keys in the real keyboard to be easily obtained, without designating the virtual key positions by carrying out touch-operations twice.

Further, in the input device according to the present invention, by utilizing the combination of the input-position and the related input-symbol, a specified input-code which is different from an input-code indicated simply by the input-position designated by the designating means, can be obtained by a relatively simple operation of the virtual key.

Namely, a greater number of characters or symbols than those indicated simply by the image of the key arrangement of the virtual keyboard, can be input.

Therefore, the input device utilizing the virtual keyboard, which allows a large number of characters or symbols to be input by simpler operation, can be realized by a relatively small number of virtual-keys.

BRIEF DESCRIPTION OF THE DRAWINGS

The above object and features of the present invention will be more apparent from the following description of the preferred embodiments with reference to the accompanying drawings, wherein:

FIG. 4 is a diagram for explaining input operations of some data in FIGS. 2A and 2B;

FIGS. 5A and 5B are block diagrams showing a second preferred embodiment according to the present invention.

DESCRIPTION OF THE PREFERRED EMBODIMENTS

Hereinafter, the description of some preferred embodiments according to the present invention will be given with reference to the accompanying drawings.

Figure 2A:
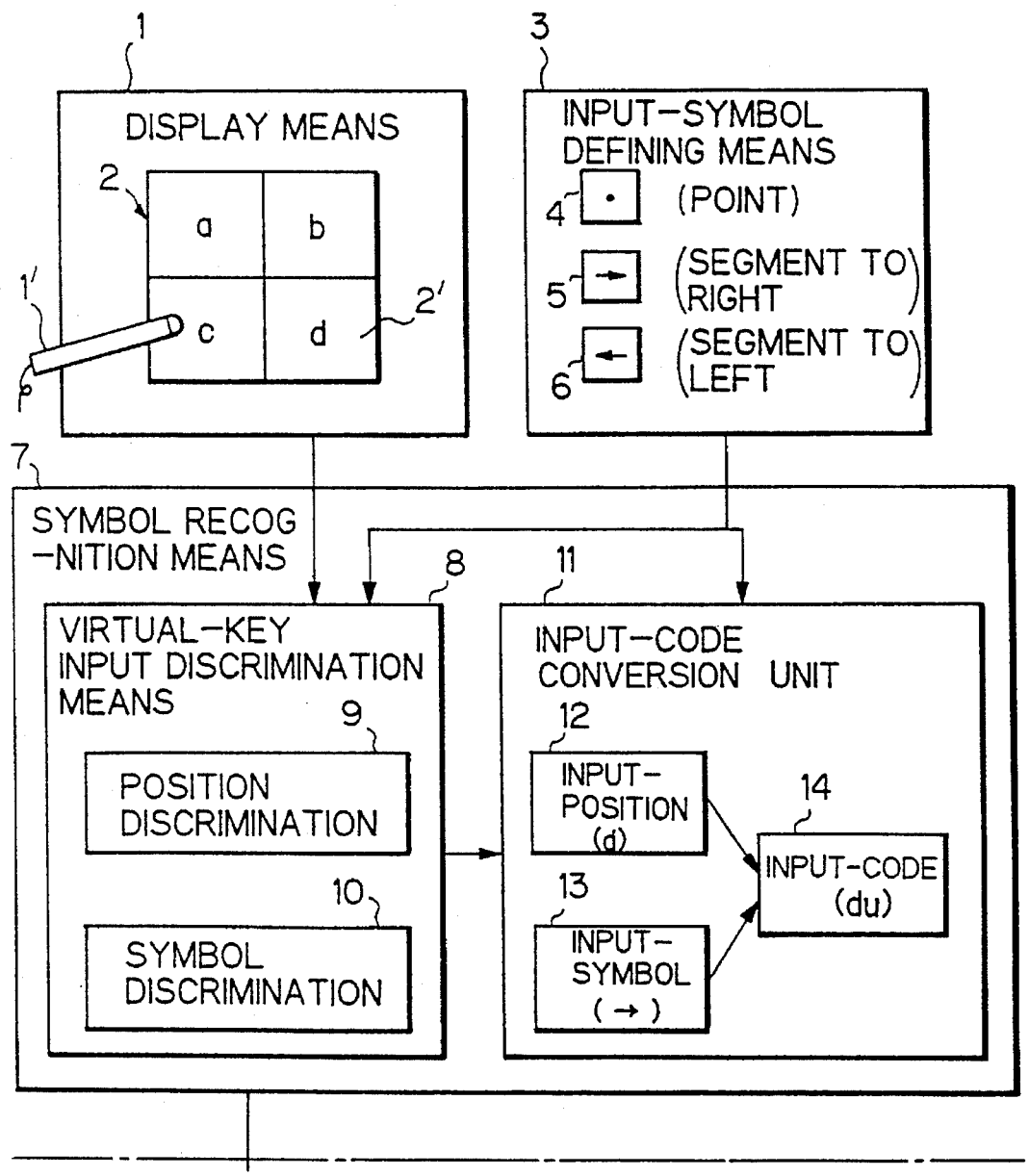
FIGS. 2A and 2B are block diagrams showing a first preferred embodiment according to the present invention.
Figure 2:
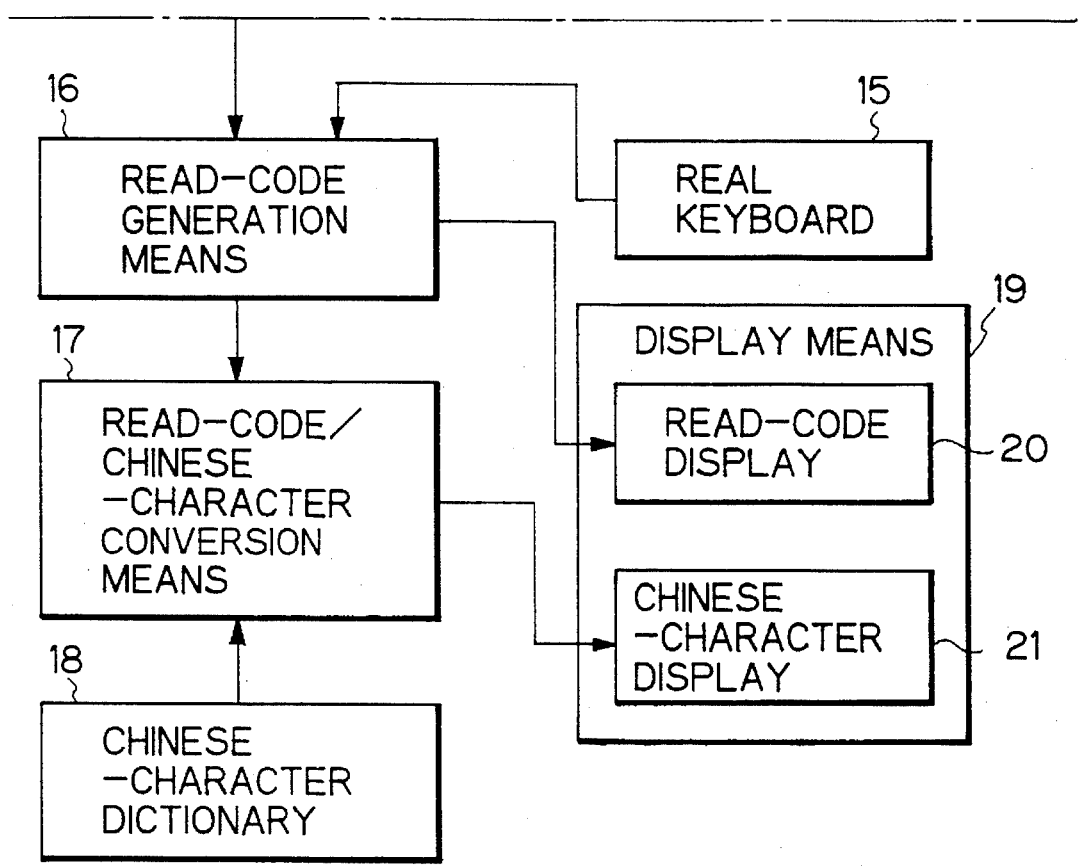

FIGS. 2A and 2B are block diagrams showing a first preferred embodiment according to the present invention. In FIG. 2A, a major part of an input device of a first preferred embodiment concerning data input operation by utilizing a real keyboard is illustrated; in FIG. 2B, the remaining part of the input device concerning a code conversion for display is illustrated.

Figure 1A:
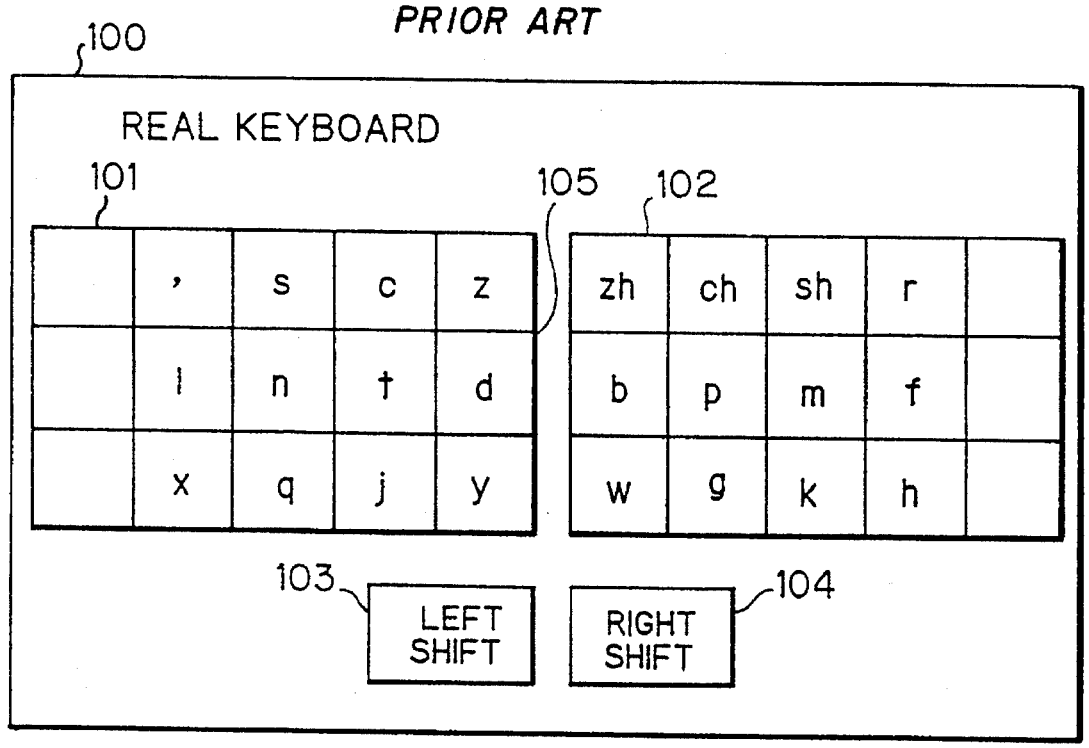
FIG. 1A is a schematic diagram showing an arrangement of a real keyboard according to a prior art.
Figure 1B:
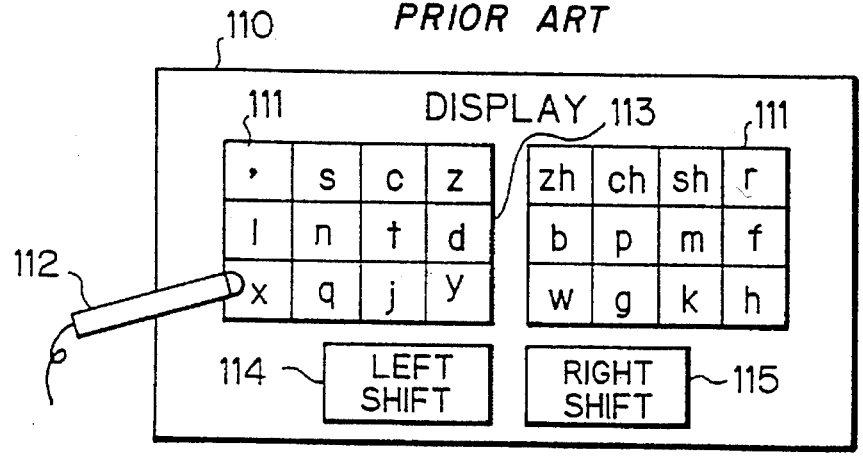
FIG. 1B is a schematic diagram showing an arrangement of a virtual keyboard according to a prior art.

Further, in FIG. 2A, 1 denotes a display means, e.g., a display unit composed of a liquid crystal display; and 1' denotes a designating means, e.g., a write-pen, which designates an input-position corresponding to a specified key in a virtual keyboard 2, and which draws a specified input-symbol at the input-position. In this case, the designating means 1' may also be a mouse, Joystick, or the like, which can draw the input-symbol with one stroke by touching the virtual keyboard 2 in such a manner that the designating means can move in at least one direction. The virtual keyboard 2 is displayed on the display means 1. Among the virtual keyboard 2, a virtual d-key indicating a "Seibo" of a character d is especially defined by the reference numeral 2'.

In this figure, 3 denotes an input-symbol defining means which defines a form and a meaning of each of the input-symbols drawn by the designating means 1' on the virtual keyboard 2. In regard to the form of each input-symbol defined by the input-symbol defining means 3, the following types are mentioned.

A first type of symbol 4 (•) indicates a point which is formed only by a touch-operation of the designating means 1'.

A second type of symbol 5(→) indicates a segment to a right direction which is formed by drawing the segment toward the right direction from a touch position of the designating means 1'.

A third type of symbol 6 (←) indicates a segment to a left direction which is formed by drawing the segment toward the left direction from a touch position of the designating means 1'.

Namely, vectors each of which has a certain length segment (a value of a length of a point is deemed to be zero) drawn by the designating means 1' and has the right or left direction in which the segment extends are defined by the input-symbol defining means 3.

Also, it should be noted that other vectors extending in an upward direction, a downward direction or oblique directions, and circles each having a certain size and a certain rotational direction in which the circle is drawn, can be defined in accordance with a request of an operator. The size and the direction of each circle can be determined by the designating means 1' with one stroke.

The meaning of each input-symbol is defined by the input-symbol defining means 3, in order to provide information about a correspondence between the form of each input-symbol and a method in which at least one key in the real keyboard is depressed. For example, the first type of symbol 4 means a single stroke of only one key on the real keyboard equivalent to an input-position on the virtual keyboard designated by the designating means 1'; a second type of symbol 5 means simultaneous strokes of a key on the real keyboard equivalent to an input-position designated by the designating means 1' and a right-shift key on the real keyboard; and the third type of symbol 6 means simultaneous strokes of a key on the real keyboard equivalent to an input-position designated by the designating means 1' and a left-shift key on the real keyboard.

Further, in FIG. 2A, 7 denotes a symbol recognition means, which discriminate an input-position designated by the designating means 1' and related input-symbol drawn at the input-position on the basis of information defined by the input-symbol defining means 3. Further, the symbol recognition means 7 is adapted to recognize a specified input-code which is equivalent to an input-code obtained by simultaneous strokes of a plurality of keys in the real keyboard, or other specified input-code which is different from an input-code indicated simply by the input-position designated by the designating means 1', in accordance with a combination of the input-position and the related input-symbol.

More specifically, the symbol recognition means 7 is constituted by a virtual-key input discrimination means 8 and an input-code conversion unit 11.

The virtual-key input discrimination means 8 is adapted to recognize an input-position designated by the designating means 1' on the virtual keyboard 2 and related input-symbol drawn at the input-position. In the virtual-key input discrimination means 8, 9 denotes a position discrimination section for carrying out a process of discriminating the input-position, and 10 denotes a symbol discrimination section for carrying out a process of discriminating the input-symbol.

The input-code conversion unit 11 is adapted to convert the thus discriminated input-position and input-symbol to a specified input-code 14 (e.g., du) on the real keyboard, in accordance with a combination of input-position information 12 (e.g., d-key) and an input-symbol information 13 (e.g., →). For example, when it is discriminated that the second type of symbol 5 is input by the designated means at an input-position of a d-key 2', an input-code corresponding to two characters "du" which is obtained by the simultaneous strokes of a d-key 2' and a right-shift key in the real keyboard, is provided.

Further, in FIG. 2B, 15 denotes a real keyboard which is provided as an option; 16 denotes a read-code generation means, which converts the input-code generated by the symbol recognition means 7 and by the real keyboard 15 to a read-code represented by a phonetic notation; and 17 denotes a read-code/Chinese-character conversion means, which converts the read-code sent from the read-code generation means 16 to corresponding code of Chinese-characters (Kanji) with reference to a Chinese-character dictionary 18. In this case, the Chinese-character dictionary 18 makes a correspondence between various read-codes and codes of Chinese-characters, and is typically constituted by a file memory in ROM (Read Only Memory), etc.

19 denotes a display means which is usually the same as the above-mentioned display means 1. In the display means 19, a read-code display section 20 is adapted to display the read-code generated by the read-code generation means 16, in the form of characters corresponding to the phonetic notation. Also, in the display means 19, a Chinese-character display section 21 is adapted to display the code of Chinese-characters sent from the read-code/Chinese-character conversion means 17, in the form of Chinese-characters indicated by the code of Chinese-characters.

Here, to clarify a relationship between an input device in the first preferred embodiment and a computer, an example of the overall construction of a computer will be briefly described with reference to FIG. 3.

Figure 3:
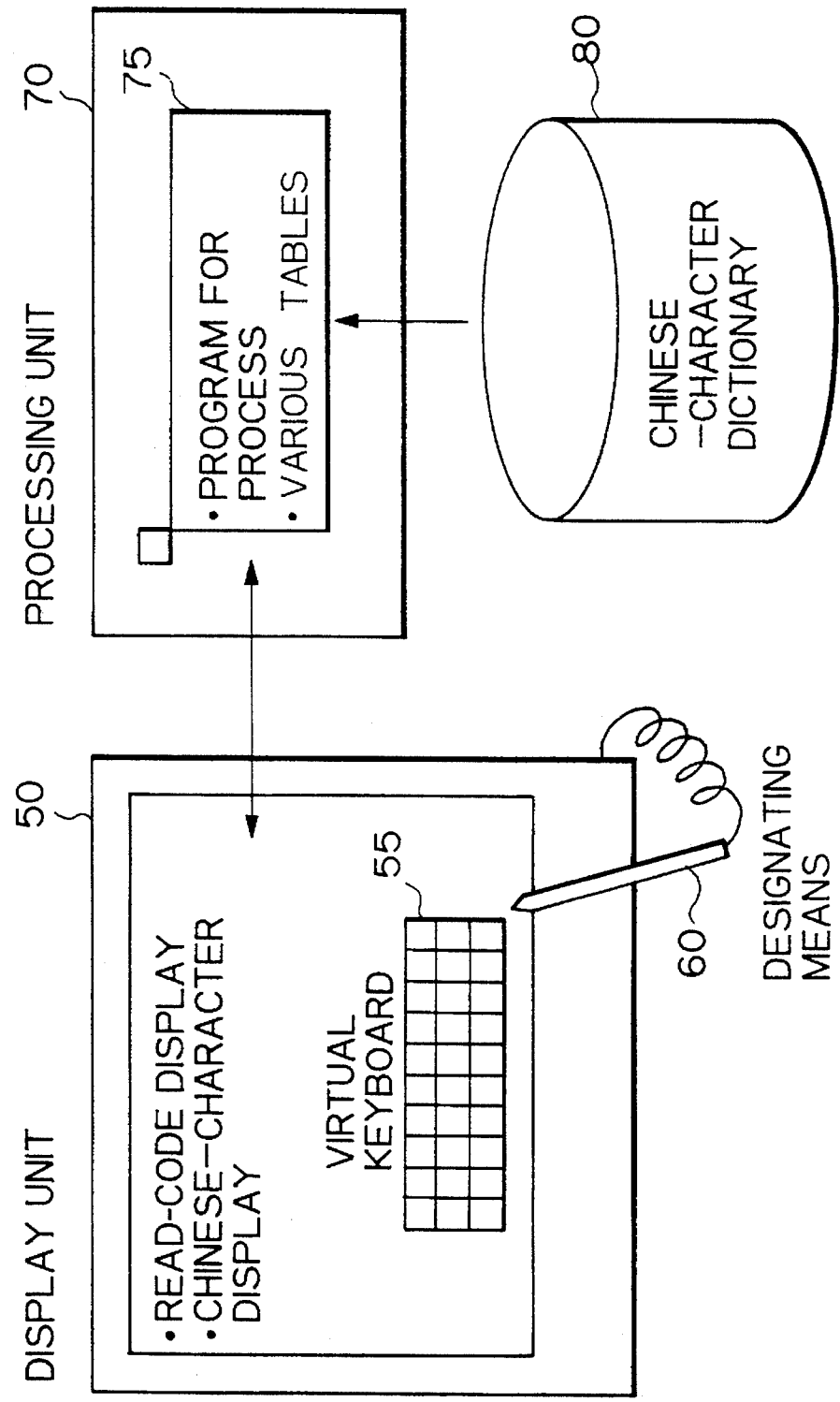
FIG. 3 is a schematic block diagram showing the overall construction of a computer utilizing a virtual keyboard to which an input device according to the present invention is applied.

FIG. 3 is a schematic block diagram showing the overall construction of a computer utilizing a virtual keyboard to which an input device according to the present invention is applied. In this case, a pen-type computer utilizing a virtual keyboard and a designating means such as a write-pen is illustrated representatively.

In FIG. 3, the pen-type computer is mainly constituted by a display unit 50, a designating means 60 such as a write-pen, a processing unit 70 and a Chinese-character dictionary 80. Further, an input device includes a virtual keyboard 55, the designating means 60 and a part of the processing unit 70.

The display unit 50 corresponds to the display means 1 shown in FIG. 2A. The virtual keyboard 55 may be displayed on a screen of the display unit 50, only when desired data has to be input. Characters or symbols corresponding to the data, are input into the processing unit 70 of the computer, by drawing a specified input-symbol on the virtual keyboard 55 with a single stroke of a designating means 60.

The processing unit 70 including the input-symbol defining means 3 and the symbol recognition means 7 in FIG. 2A is preferably realized by a CPU (Central Processing Unit) of the computer. The processing unit 70 has a memory unit 75 composed of a ROM or a RAM (Random Access Memory), which stores a program for a process of the input-symbol and various tables for input-code conversion, etc. When an input-symbol is input into the processing unit 70 by means of the virtual keyboard 55 and the designating means 60, the processing unit 70 discriminates the input-position and the input-symbol and generates the corresponding input-code with reference to the tables in the memory unit 75 by utilizing the program for the process of the input-symbol.

Further, the thus generated input-code converts corresponding read-code. Further, if necessary, the read-code is converted to a corresponding code of Chinese-characters with reference to the Chinese-character dictionary 80. Finally, the read-code or the code of Chinese-characters is displayed on the screen of the display unit 50.

In such a construction utilizing the virtual keyboard of the present invention, a function of defining a form and a meaning of each input-symbol and a function of discriminating the input-position and the input-symbol can be realized by software in a computer. Therefore, a pen-type computer having a relatively small size can be realized, in which any input-code can be generated by one touch-operation with a write-pen, corresponding to an input-code that is obtained by two simultaneous key strokes on a real keyboard.

FIG. 4 is a diagram for explaining input operations of some data in FIGS. 2A and 2B. In this figure, some examples, in which input-symbols corresponding to Chinese are input representatively. Hereinafter, any component that is the same as that mentioned before will be referred to using the same reference number.

In FIG. 4, as the content of input-code, a "Seibo" indicated by a character d and a combination of a "Seibo" and "Kaion" indicated by characters "di" and "du" are mentioned.

Hereinafter, three cases of input operations, in which the data corresponding to the character d, and the characters "di" and "du" are input, will be described in detail.

(1) the case where the character d is input

First, an input-position corresponding to the d-key 2' on the virtual keyboard 2 is designated by the designating means 1' (a write-pen, a mouse or cursor). At this time, a point is input as an input-symbol only by touching the d-key 2' without moving the designating means 1'. Subsequently, the virtual-key input discrimination means 8 discriminates the input-position corresponding to the d-key 2' and recognizes that the input-symbol is a point as defined by the first type of symbol 4. Then, the input-code conversion unit 11 converts the input-symbol to an input-code which is obtained by a single stroke of a d-key on a real keyboard.

Further, the read-code generation means 16 converts the the input-code (d) to a corresponding read-code, and finally displays the read-code in the form of the character d on the screen of the display means 19.

(2) the case where the character "di" is input

First, an input-position corresponding to the d-key 2' on the virtual keyboard 2 is designated by the designating means 1' (a write-pen, a mouse or cursor). At this time, a segment in a left direction is drawn as an input-symbol by moving the designating means 1' in the left direction on the d-key 2'. Subsequently, the virtual-key input discrimination means 8 discriminates the input-position corresponding to the d-key 2' and recognizes that the input-symbol is a segment to a left direction as defined the third type of symbol 6. Then, the input-code conversion unit 11 converts the input-symbol to an input-code which is obtained by simultaneous strokes of a d-key and a left-shift key on a real keyboard.

Further, the read-code generation means 16 converts the the input-code (di) to corresponding read-code, and finally displays the read-code in a form of the character "di" on the screen of the display means 19.

(3) the case where the character "du" is input

First, an input-position corresponding to the d-key 2' on the virtual keyboard 2 is designated by the designating means 1' (a write-pen, a mouse or cursor). At this time, a segment in a right direction is drawn as an input-symbol by moving the designating means 1' in the right direction on the d-key 2'. Subsequently, the virtual-key input discrimination means 8 discriminates the input-position corresponding to the d-key 2' and recognizes that the input-symbol is a segment to a right direction as defined by the second type of symbol 5. Then, the input-code conversion unit 11 converts the input-symbol to an input-code which is obtained by simultaneous strokes of a d-key and a right shift key in a real keyboard.

Further, the read-code generation means 16 converts the the input-code (du) to corresponding read-code, and finally displays the read-code in a form of the character "du" on the screen of the display means 19.

In the first preferred embodiment, the explanation has been made concerning the example in which the "Seibo" and "Kaion" of Chinese are input by using an input device according to the present invention. However, an input device according to the present invention can be applied to the example in which Japanese characters are input utilizing a virtual keyboard, as will be described below.

FIGS. 5A and 5B are block diagrams showing a second preferred embodiment according to the present invention.

In FIG. 5A, a configuration of a virtual keyboard in an input device of the second preferred embodiment is illustrated; in FIG. 5B, a method in which input-symbols corresponding to Japanese are input.

To be more specific about FIG. 5A, the virtual keyboard in the case where the present invention is applied to an input device for inputting Japanese by means of Roman characters. In this embodiment, a plurality of keys are constituted by ten kinds of alphabet-keys which allow all the characters of the Japanese syllabary ("Kana" characters) in Japanese to be input, a voiced-sound key for inputting voiced sounds (referred to as a first auxiliary key AUX-1), and a conversion-key for converting an input read-code to corresponding Chinese-characters, etc., (referred to as a second auxiliary key AUX-2).

The above-mentioned alphabet-keys are used for inputting all the phonetic characters of each line [(from an a あ)-line through a wa わ)-line)] in the Japanese syllabary (あいうえお...). Further, in the case where an input-code corresponding to Japanese is to be obtained by utilizing the virtual keyboard shown in FIG. 5A, a specified input-symbol is input by means of a designating means, e.g., a write-pen. At this time, at least one character of the Japanese syllabary is also input by a combination of the specified input-symbol and a key position designated by the designating means. For example, any character of the a-line is input by a combination of an a-key and a specified input-symbol. Also, any character of the ka か)-line is input by a combination of a K-key and a specified input-symbol.

To be more specific about FIG. 5B, a concrete example concerning a method in which input-symbols corresponding to Japanese are defined.

In this case, the following five kinds of input-symbols are defined to determine the input-codes: ① a point only by a touch-operation of a write-pen, etc. (•); ② a segment drawn toward a right direction from a point designated by a write-pen, etc. (→); ③ a segment drawn toward a downward direction from a point designated by a write-pen, etc. (↓); ④ a segment drawn toward a left direction from a point designated by a write-pen, etc. (←); and ⑤ a segment drawn toward an upward direction from a point designated by a write-pen, etc. (∧).

For example, when the symbol ① of the point (•) is input at an input-position of the a-key in the a-line, a character of Japanese syllabary of "a" あ) is input. Further, when the symbol ② of the segment to a right direction (→) is input at an input-position of the a-key, a character of Japanese syllabary of "i" い) is input. Further, when the symbol ③ of the segment to a downward direction (↓) is input at an input-position of the a-key, a character of Japanese syllabary of "u" う) is input. Further, when the symbol ④ of the segment to a left direction (←) is input at an input-position of the a-key, a character of Japanese syllabary of "e" え) is input. Further, when the symbol ⑤ of the segment to an upward direction (↑) is input at an input-position of the a-key, a character of Japanese syllabary of "o" お) is input.

Further, in regard to the a-line, when the symbol ① of the point (•) is input at an input-position of the K-key in the ka-line, a character of Japanese syllabary of "ka" (か) is input. Further, when the symbol ② of the segment to a right direction (→) is input at an input-position of the K-key, a character of Japanese syllabary of "ki" き) is input Also, the other characters of Japanese syllabary can be input in a similar manner to that mentioned above, by combination of alphabet-keys and input-symbols.

Further, by means of a combination of a voiced-sound key (AUX-1) and each input-symbol, a symbol indicating a voiced sound ･), a symbol indicating a semi-voiced sound (•), a symbol indicating a double consonant, a symbol indicating a syllable composed of consonants including a semivowel and also composed of a vowel (also referred to as a symbol of "Youon"), and the like can be input.

Further, by means of a combination of a conversion-key (AUX-2) and each input-symbol, a conversion process, a non-conversion process, extended conversion process, and the like can be executed for the input read-code.

According to the second preferred embodiment, it becomes possible for various characters and symbols corresponding to Japanese to be input by an extremely small number of virtual-keys, e.g., ten kinds of alphabet-keys and two kinds of auxiliary keys.

Figure 6:
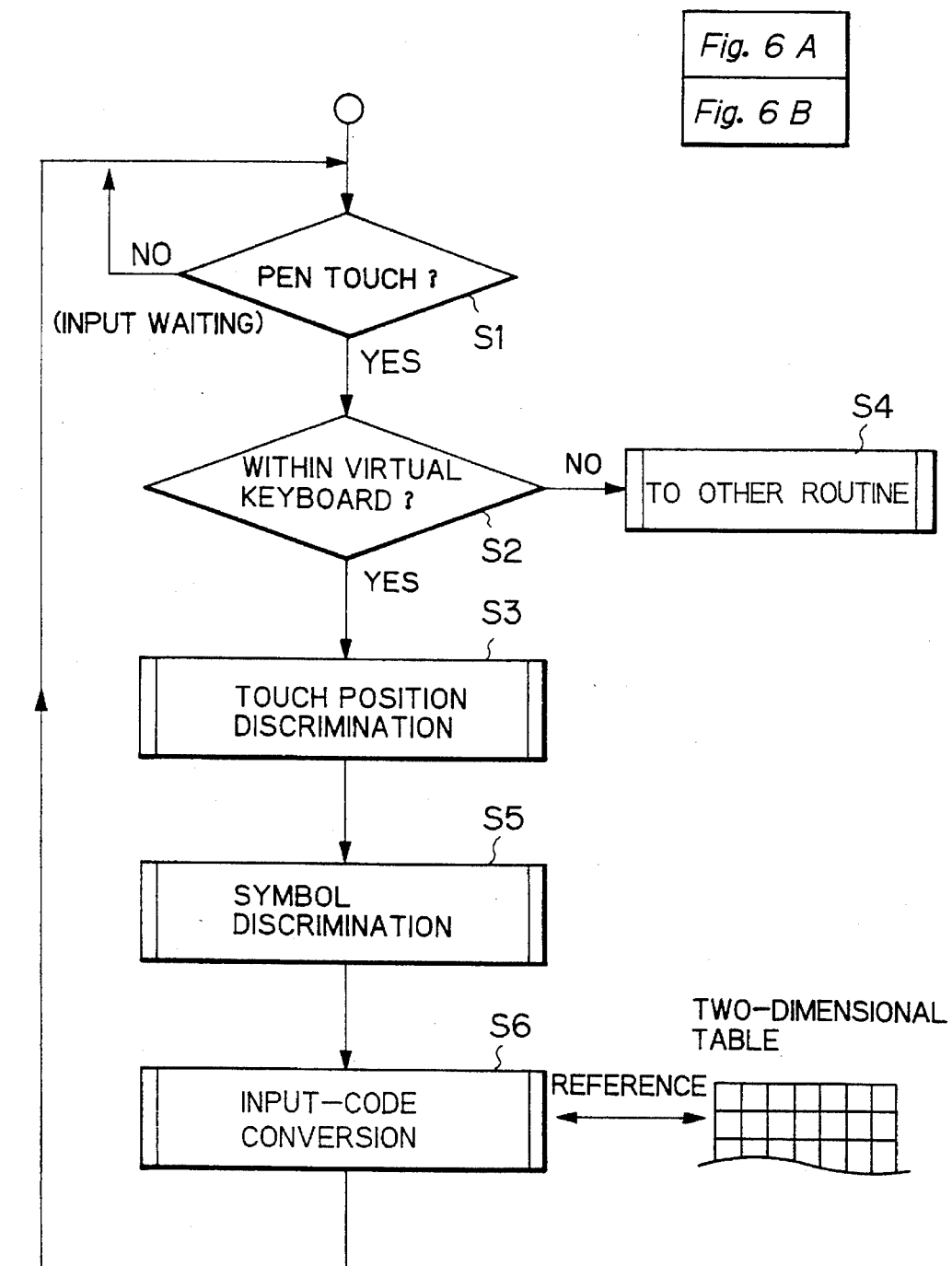
FIGS. 6A and 6B are flowcharts each for explaining a process of data which is input by utilizing a virtual keyboard shown in FIGS. 5A and 5B.
Figure 6B:
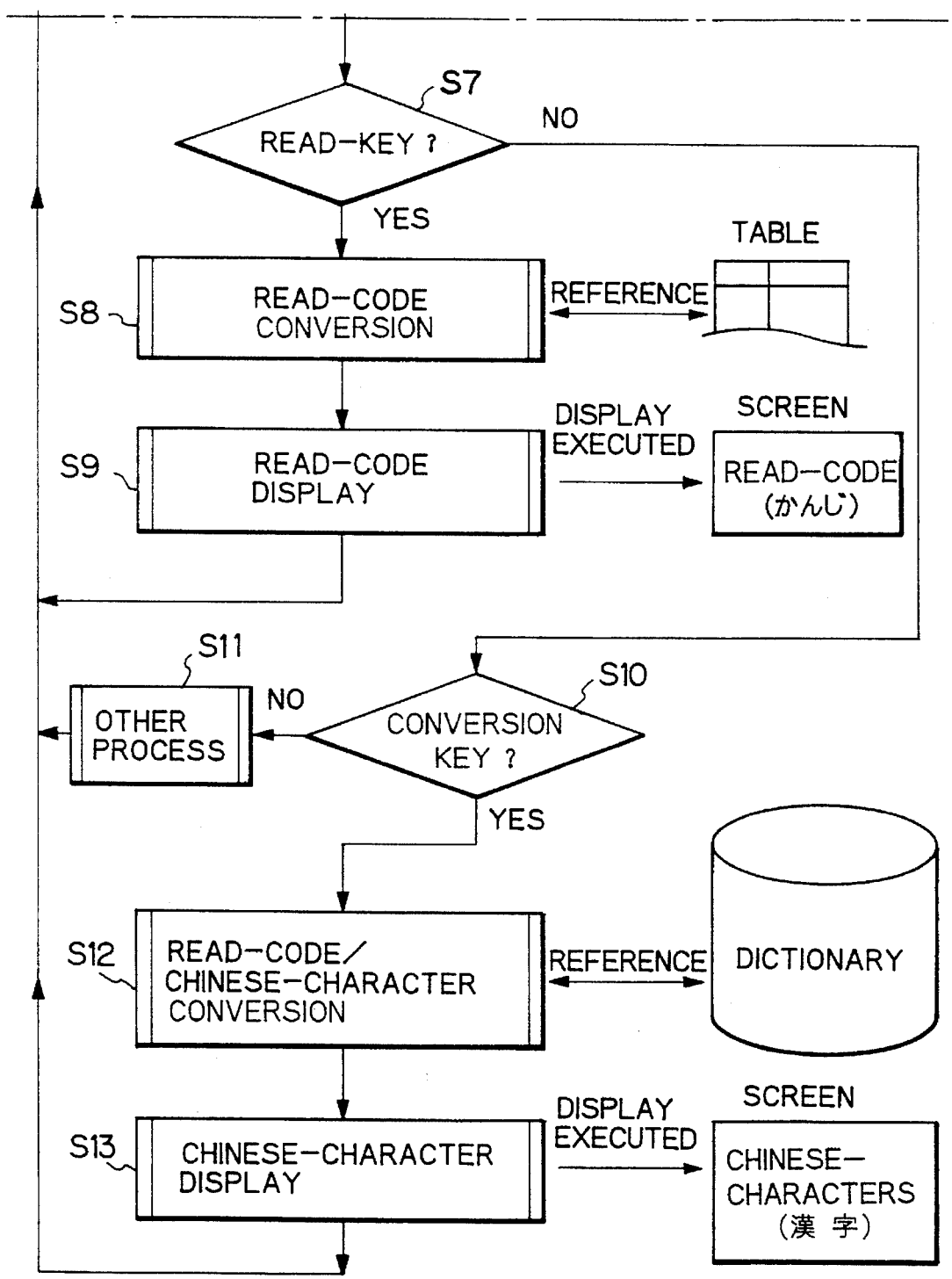

FIGS. 6A and 6B are flowcharts each for explaining a process of data which is input by utilizing a virtual keyboard shown in FIGS. 5A and 5B.

Typically, the process of data by utilizing a virtual keyboard is executed by a processing unit of a computer as shown in FIG. 3.

First, in a step S1 of FIG. 6A, in the case where a specified input-position is not touched by a write-pen, the processing unit is waiting for data input. If it is discriminated that a touch-operation by the write-pen is executed, it is confirmed whether or not this touch-operation is carried out within the virtual keyboard (S2). If the touch-operation is carried out outside the virtual keyboard, the flowchart proceeds to any other routine (S4).

On the other hand, if the touch-operation is carried out within the virtual keyboard, it is discriminated which key in a key arrangement on a screen of a display unit is touched by the write-pen to determine an input-position (touch position) of the write-pen (S3). At this time, it is also discriminated which input-symbol an operator inputs by using the write-pen (S5). In this case, input-symbol information concerning all the input-symbols that the operator inputs, can be defined in advance and can be stored in a two-dimensional table, together with input-position information.

In a step S6, the thus discriminated input-position and input-symbol are converted to a specified input-code on the real keyboard, in accordance with a combination of the input-position information and the input-symbol information, with reference to the two-dimensional table. Further, in a step S7 of FIG. 6B, it is discriminated whether or not the specified input-code corresponds to one of read-keys such as alphabet-keys. If the specified input-code corresponds to the read-key, this read-key is converted to a corresponding read-code with reference to the table provided in the processing unit (S8). Further, in a step S9, a process of displaying the read-code in the form of corresponding characters or symbols on the screen of the display unit is executed.

In the step S8, if the specified input-code does not correspond to a read-key, it is discriminated whether or not the specified input-code corresponds to a conversion-key (S10). If the specified input-code does not correspond to a conversion-key, the flowchart proceeds to any other routine (S11). On the other hand, if the specified input-code corresponds to a conversion-key, the read-code is converted to a code of Chinese-characters (S12), with reference to a Chinese-character dictionary.

Further, in a step S13, a process of displaying the code of Chinese-characters in the form of corresponding Chinese-characters on the screen of the display unit is executed.

In such a process of data according to the second preferred embodiment, the input-symbol is discriminated on the basis of a combination of input-position information and input-symbol information. Therefore, an operator or user can input data with a virtual keyboard by a simpler operation than in the prior art.

While the present invention has been described as related to the preferred embodiments, it will be understood that various changes and modifications may be made without departing from the spirit and the scope of the invention as hereinafter claimed.

I claim:

1. An input device utilizing a virtual keyboard, which enables data to be input by designating at least one input-position corresponding to at least one key indicated in an image of a key arrangement displayed on a display means, by using a designating means, said input device comprising:

an input-symbol defining means for defining a form and a meaning of each of input-symbols drawn by said designating means across said image of said key arrangement; and a symbol recognition means for discriminating said input-position and related input-symbol drawn across said image of said key arrangement said input-position on the basis of information defined by said input-symbol defining means and for generating at least one input-code corresponding to at least one input-code in a real keyboard, wherein said input device is operative to generate a specified input-code in accordance with a combination of said input-position and said related input-symbol discriminated by said symbol recognition means, and wherein said input device is operative to display characters or symbols corresponding to said specified input-code on said display means.

2. An input device as set forth in claim 1, wherein said form of each input-symbol defined by said input-symbol defining means includes a length of a segment drawn by said designating means and a direction in which said segment extends.

3. An input device as set forth in claim 2, wherein said designating means is composed of a write-pen which draws said form of each input-symbol by touching said virtual keyboard in such a manner that said write-pen can move in at least one direction.

4. An input device as set forth in claim 1, wherein said form of each input-symbol defined by said input-symbol defining means includes a size of a circle drawn by said designating means and a rotational direction in which said circle is drawn.

5. An input device as set forth in claim 4, wherein said designating means is composed of a write-pen which draws said form of each input-symbol by touching said virtual keyboard in such a manner that said write-pen can move in at least one rotational direction.

6. An input device as set forth in claim 1, wherein said meaning of each input-symbol defined by said input-symbol defining means includes information about a correspondence between said form of each of input-symbols and a method in which at least one key in said real keyboard is depressed.

7. An input device as set forth in claim 1, wherein said specified input-code generated in accordance with a combination of said input-position and said related input-symbol is equivalent to at least one input-code obtained by simultaneous strokes of a plurality of keys in said real keyboard.

8. An input device as set forth in claim 7, wherein said form of each input-symbol defined by said input-symbol defining means includes a length of a segment drawn by said designating means and a direction in which said segment extends.

9. An input device as set forth in claim 7, wherein said form of each input-symbol defined by said input-symbol defining means includes a size of a circle drawn by said designating means and a rotational direction in which said circle is drawn.

10. In input device as set forth in claim 7, wherein said meaning of each input-symbol defined by said input-symbol defining means includes information about a correspondence between said form of each of input-symbols and a method in which at least one key in said real keyboard is depressed.

11. An input device as set forth in claim 1, wherein said specified input-code generated in accordance with a combination of said input-position and said related input-symbol is equivalent to a specified input-code which is different from an input-code indicated simply by said input-position designated by said designating means.

12. An input device as set forth in claim 11, wherein said form of each input-symbol defined by said input-symbol defining means includes a length of a segment drawn by said designating means and a direction in which said segment extends.

13. An input device as set forth in claim 11, wherein said form of each input-symbol defined by said input-symbol defining means includes a size of a circle drawn by said designating means and a rotational direction in which said circle is drawn.

14. An input device is set forth in claim 11, wherein said meaning of each input-symbol defined by said input-symbol defining means includes information about a correspondence between said form of each of input-symbols and a method in which at least one key in said real keyboard is depressed.

15. An input device as set forth in claim 1, wherein said input device is applied to a computer in which characters indicating Chinese are input.

16. An input device as set forth in claim 1, wherein said input device is applied to a computer in which Roman characters indicating Japanese are input.

17. An input device as set forth in claim 7, wherein said input device is applied to a computer in which characters indicating Chinese are input.

18. An input device as set forth in claim 11, wherein said input device is applied to a computer in which Roman characters indicating Japanese are input.

* * * * *